No. 751,111. PATENTED FEB. 2, 1904.
A. W. SEVERANCE.
SIDEHILL HARVESTER.
APPLICATION FILED AUG. 11, 1902.
NO MODEL. 3 SHEETS—SHEET 1.

No. 751,111. PATENTED FEB. 2, 1904.
A. W. SEVERANCE.
SIDEHILL HARVESTER.
APPLICATION FILED AUG. 11, 1902.
NO MODEL. 3 SHEETS—SHEET 3.

No. 751,111. Patented February 2, 1904.

UNITED STATES PATENT OFFICE.

ADAM W. SEVERANCE, OF WALLA WALLA, WASHINGTON, ASSIGNOR TO HOLT MANUFACTURING COMPANY, OF STOCKTON, CALIFORNIA, A CORPORATION OF CALIFORNIA.

SIDEHILL-HARVESTER.

SPECIFICATION forming part of Letters Patent No. 751,111, dated February 2, 1904.

Application filed August 11, 1902. Serial No. 119,252. (No model.)

*To all whom it may concern:*

Be it known that I, ADAM W. SEVERANCE, a citizen of the United States, residing at Walla Walla, county of Walla Walla, State of Washington, have invented an Improvement in Sidehill-Harvesters; and I hereby declare the following to be a full, clear, and exact description of the same.

My invention relates to an apparatus for harvesting grain and the like which is especially designed for use upon sidehills and in such a manner that the threshing and cleaning mechanism of the apparatus may be maintained substantially horizontal transversely of the machine, so that the grain delivered into this portion of the machine will not be bunched up at one side or the other.

My invention consists of the parts and the constructions and combinations of parts, which I will hereinafter describe and claim.

Figure 1:
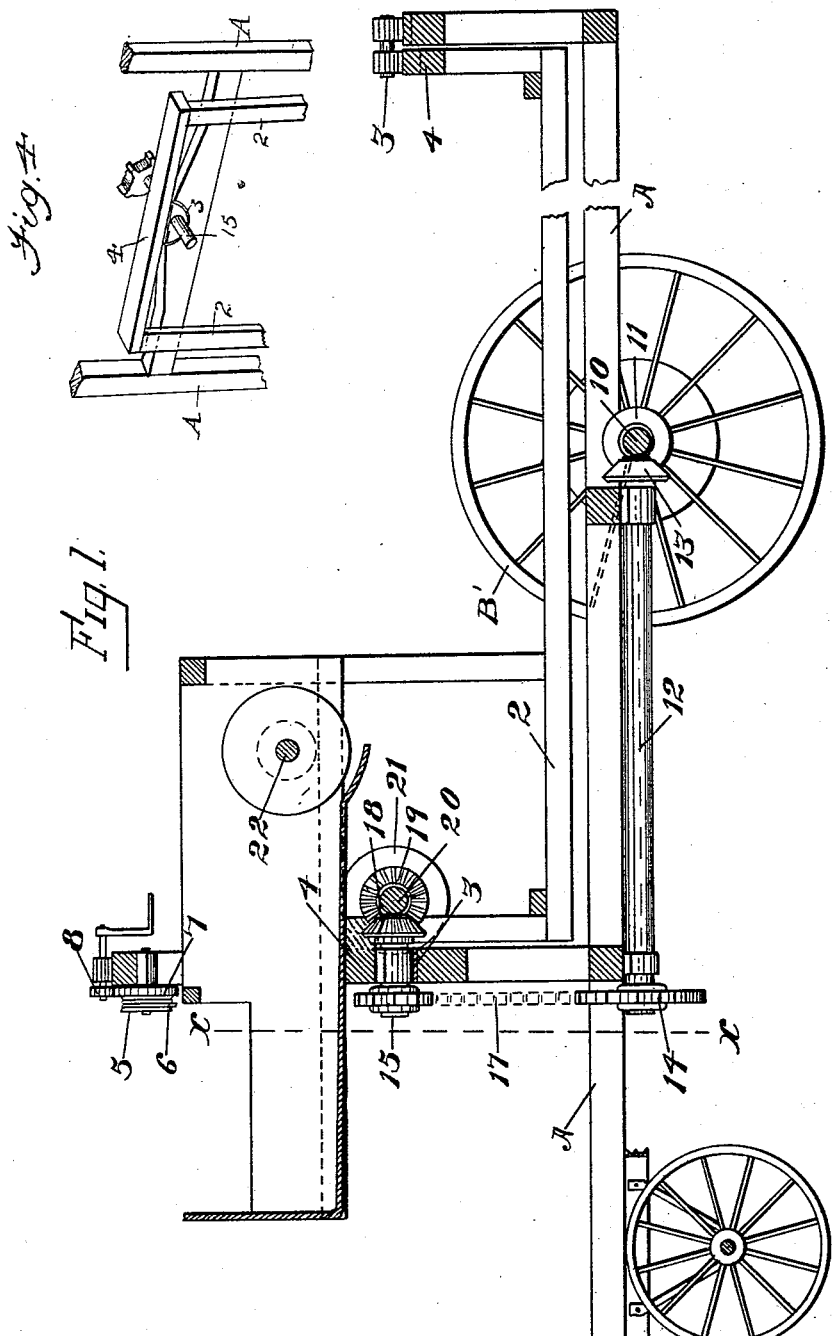
Figure 2:
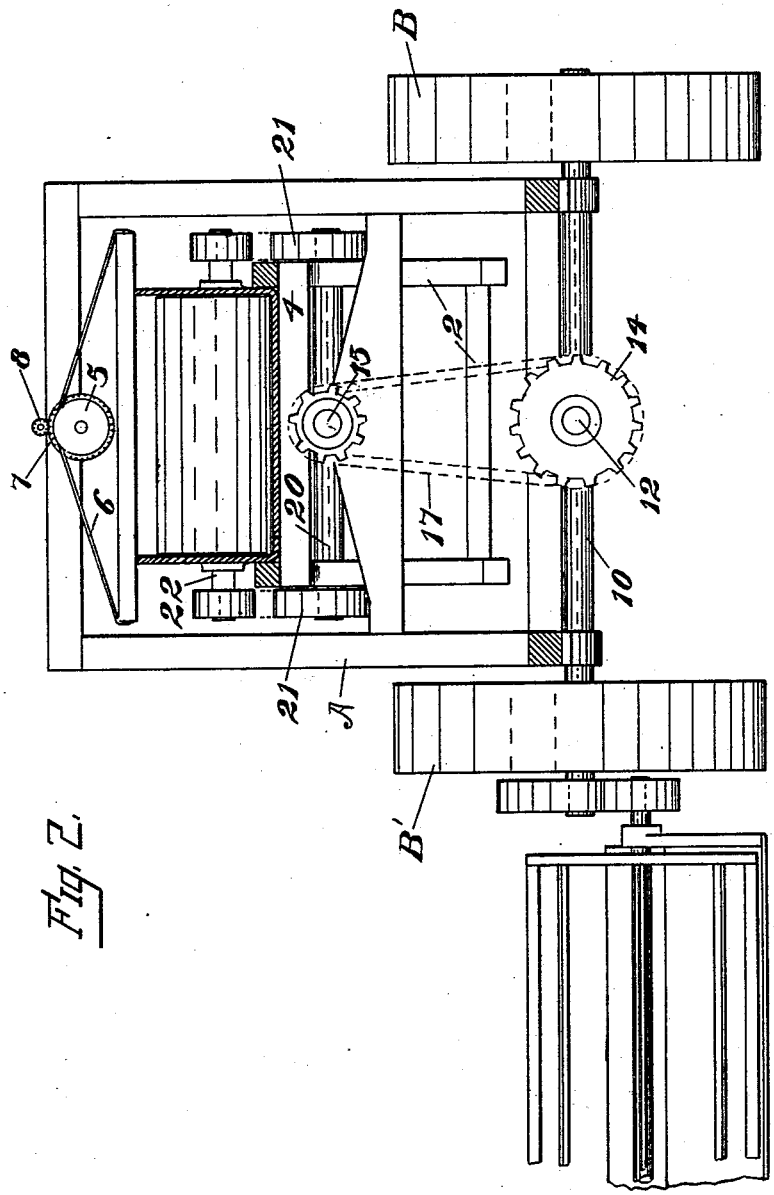
Figure 3:
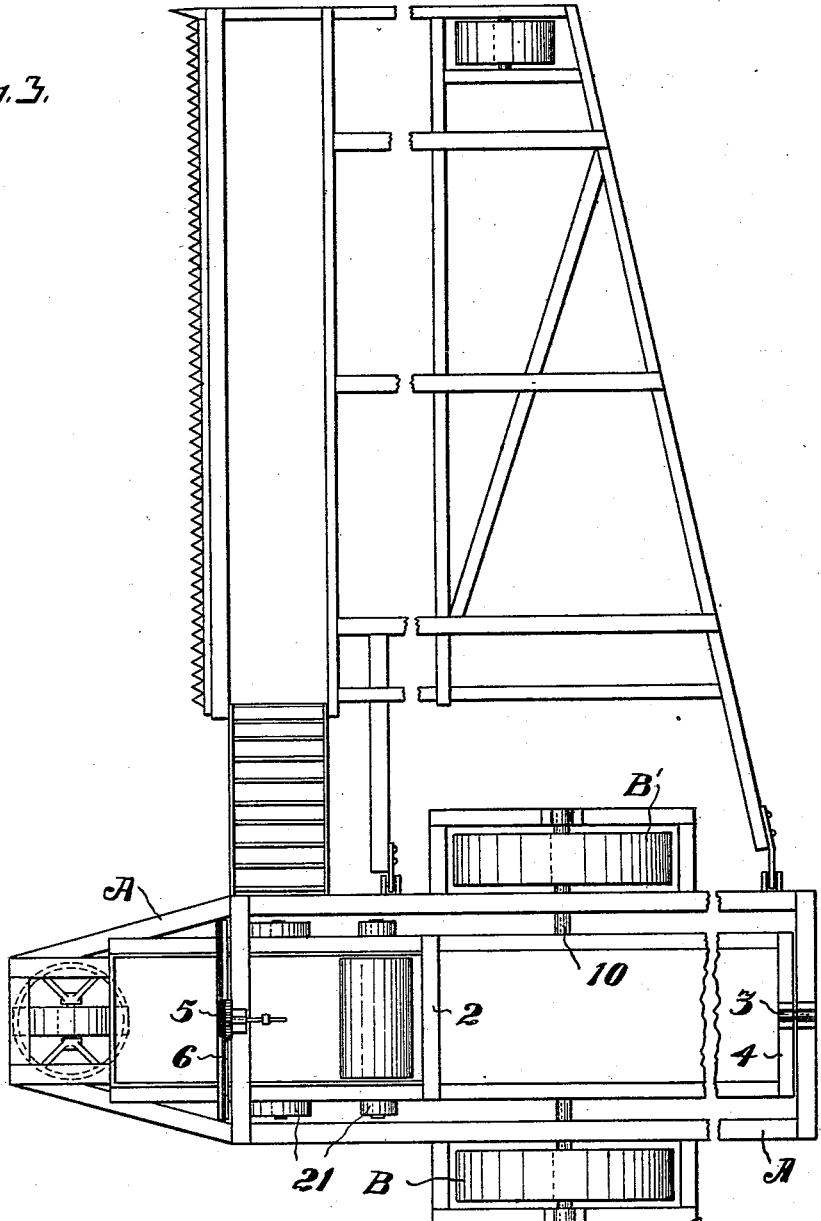

Figure 1 is a transverse longitudinal central section of my invention. Fig. 2 is a cross-section on line $x$ $x$, Fig. 1. Fig. 3 is a plan view of the machine. Fig. 4 is a detail in perspective, showing the manner of suspending one end of the swinging frame.

In the harvesting of grain and the like which grows upon sidehills difficulty is experienced in maintaining the threshing and cleaning portion of the machine in a level condition, and when this is not done the grain and chaff slide to one side and mass in such a manner as to be very imperfectly separated.

It is the object of my invention to overcome such difficulties.

In the present construction I have shown a main frame A mounted upon bearing-wheels B and B' and having the header-frame H, which carries the sickle and traveling belt or draper, hinged to one side and braced in any usual or suitable manner. This mechanism is driven by belt or gearing from the bearing-wheel B' upon that side of the machine.

The threshing and separating mechanism is carried upon an independent supplemental frame 2, which is suspended upon longitudinal shafts or pivots 3 at the ends of the main frame, this frame having suitable transverse timbers, as at 4, to serve as supports for the pivot pins or shafts. The frame thus suspended is allowed to swing freely within the main frame. I prefer to pivot this suspended frame as low as possible, so that the bottom will not have an excessive movement from side to side, since this would necessitate making the main frame A much wider than the ordinary construction, and therefore more difficult to ship upon railway-cars, which is a consideration in constructing these machines. The upper part of the swinging frame is provided with any suitable means for tilting it from side to side about its pivot-points. This device may be a curved rack, a corresponding pinion with hand-wheel crank, worm-gear, sprocket-wheel, chains, or any equivalent device which would be easily supplied by a mechanic. I have here illustrated the device by means of a pulley or wheel 5, around which the rope or chain 6 passes, this rope or chain being connected with the tilting portion 2 of the machine. In order to provide the necessary power for tilting so heavy a mechanism, I have here shown a gear 7 mounted upon the pulley-shaft and a pinion 8 engaging this gear. The shaft of this pinion may have a hand wheel, crank, or other connecting device, and by turning it the rope or chain will be wound from one side of the pulley, thus tilting the swinging frame in that direction. In order to transmit power to drive the threshing-cylinder, the carrying-belts, the shaking-shoes, and other mechanism of such an apparatus, the main-wheel shaft 10 is here shown as extended across the main frame and having fixed upon its central portion a bevel-gear 11.

12 is a shaft extending longitudinally of the main frame, upon which it is centrally journaled, and this shaft has a pinion 13, which engages the bevel-gear 11, so that motion is transmitted to this shaft when the machine is being hauled about the field. Upon this longitudinal shaft 12 is fixed a sprocket-wheel 14 or equivalent means for transmitting motion. Upon the swinging frame and in line with the pivot-shafts thereof is a shaft 15, having upon it a sprocket-wheel or equivalent means for connection with the driver 14. In the present case I have illustrated a means of driving consisting of these two sprocket-wheels and an intermediate chain 17, so that motion is transmitted to the shaft 15. This shaft carries a bevel-gear 18, which meshes with a bevel-gear 19, mounted upon a shaft 20, which is horizontally journaled on the swinging separator-frame. It will be seen that by this construction the bevel-gear upon the shaft 20 has its axis on the line of the swinging pivots of the frame. Consequently the companion bevel-gear will always remain in mesh with it, no matter how much the frame may be swung from one side to the other.

From the transverse shaft 20 belt-pulleys or other equivalent driving mechanism, as at 21, serve to transmit power to drive the threshing-cylinder, which is mounted upon the shaft 22. Other belt-pulleys may be connected and driven from any other suitable portion of the machine, so that the feeder, the grain-carrying belts, the fan or fans, and the cleaning-screens, grain-transferring augers, &c., may all be driven from the transverse shaft 20 of the swinging frame. These parts being common to all threshing-machines I have not here illustrated them, as they will be readily understood by any one familiar with such machines, the essence of my invention being to provide a means for maintaining the threshing and separator mechanism approximately level transversely, while the main-wheel frame is allowed to accommodate itself to varying inclines and irregularities of surface over which it passes.

The length of these machines is such that it is not necessary to compensate for variations in the level in the direction of travel of the machine, and as the grain is usually cut by moving the machine at right angles with the line of inclination the transverse leveling is the principal thing necessary to be considered. I have only shown so much mechanism in the present drawings and description as will illustrate the particular features which I believe to be new.

Having thus described my invention, what I claim, and desire to secure by Letters Patent, is—

1. In a sidehill-harvester the combination of a main shaft and bearing-wheels thereon; a main-wheel frame, having a header attachment at one side; a threshing and cleaning frame; journals at diametrically opposite ends of the threshing-frame and extending longitudinally in line one with the other upon which journals the threshing-frame is suspended and about which it is tiltable; and means for transmitting motion from the main-wheel shaft to the mechanism carried upon the threshing-frame.

2. In a sidehill-harvester the combination of a main frame having bearing-wheels; a header attachment adapted to follow the contour of the ground; a supplemental frame having horizontal pivots at diametrically opposite ends and disposed one in line with the other, by which the said supplemental frame is suspended within the main frame; a threshing and cleaning mechanism carried upon the supplemental frame; and means for transmitting motion from the main wheels to the mechanism carried upon the threshing-frame.

3. The combination in a header and thresher of a main-wheel frame; a header attachment adapted to follow the contour of the ground; a supplemental frame having transverse timbers at the ends; horizontal pivots extending longitudinally in line and one supported upon each of said transverse timbers whereby the supplemental frame is capable of swinging transversely of the main frame; threshing and cleaning mechanism carried upon the supplemental frame; and mechanism including a driven shaft and intermeshing gears whose axes are in the horizontal plane of the pivots about which the supplemental frame swings transversely.

4. The combination in a header and thresher of a main-wheel frame and a header attachment adapted to follow the contour of the ground; a supplemental frame carrying a threshing and cleaning mechanism; transverse timbers at opposite ends of the supplemental frame; a horizontal pivot-shaft supported upon each of said timbers said shafts disposed longitudinally in line whereby the supplemental frame is tiltable from side to side relative to the main frame; and a device by which said tilting motion is regulated and controlled.

5. The combination in a header and thresher of a main-wheel frame; a header attachment adapted to follow the contour of the ground; a supplemental frame having transverse timbers at the ends; horizontal pivot-shafts centrally located relative to the timbers and lying longitudinally in line one with the other; threshing and cleaning mechanism carried by the main frame; a pulley and gearing connecting the main and supplemental frame; and means for operating said gear to maintain the swinging frame transversely level.

6. The combination of a main-wheel frame; a header attachment adapted to follow the contour of the ground; a main shaft and bearing-wheels thereon; a supplemental swinging frame; longitudinal pivots at opposite ends of the swinging frame and disposed axially in line; mechanism to turn the swinging frame with relation to the main frame; a shaft journaled longitudinally and centrally upon the main frame; bevel-gears by which motion is transmitted from the main shaft to the longitudinal shaft, a shaft journaled on the swinging frame in line with the suspending pivots thereof; sprocket-wheels carried by said longitudinal shafts; and a chain by which motion is transmitted from the main-frame shaft to the supplemental-frame shaft.

7. The combination in a header and thresher of a main frame having bearing-wheels and axle, a supplemental frame suspended by longitudinal pivots upon the main frame, and tiltable from side to side about its pivots, a longitudinal shaft centrally journaled upon the main frame, a similar shaft journaled upon the supplemental frame in line with the suspending pivots thereof, sprocket-wheels and connecting-chain for transmitting motion to the supplemental-frame shaft, a transverse shaft journaled upon the supplemental frame and bevel-gears by which motion is transmitted thereto from the longitudinal shaft.

8. The combination in a header and thresher of a main-wheel frame, a supplemental frame journaled thereto by longitudinal pivots whereby it is adapted to swing transversely, means for adjusting and limiting the swing of said supplemental frame, means for transmitting motion to the mechanism carried thereon consisting of a transverse shaft, a longitudinal shaft journaled in the line of the supports of said frame, bevel-gears connecting the two shafts, a longitudinal shaft centrally journaled upon the main frame, bevel-gears by which motion is transmitted thereto from the main-wheel shaft and mechanism whereby motion is transmitted from the longitudinal shaft on the main frame to the longitudinal shaft on the supplemental frame.

In witness whereof I have hereunto set my hand.

ADAM W. SEVERANCE.

Witnesses:
W. T. DOVELL,
O. L. INGRAM.